(12) United States Patent
Bou Daher et al.

(10) Patent No.: US 11,483,647 B2
(45) Date of Patent: Oct. 25, 2022

(54) SYSTEMS AND METHODS FOR ADAPTIVE BEAMFORMING

(71) Applicant: Bose Corporation, Framingham, MA (US)

(72) Inventors: Elie Bou Daher, Marlborough, MA (US); Cristian M. Hera, Lancaster, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/024,361

(22) Filed: Sep. 17, 2020

(65) Prior Publication Data

US 2022/0086564 A1 Mar. 17, 2022

(51) Int. Cl.
*H04R 1/40* (2006.01)

(52) U.S. Cl.
CPC .................... *H04R 1/406* (2013.01)

(58) Field of Classification Search
CPC ....... G10K 11/17854; G10K 11/17857; G10K 11/17817; G10K 2210/1282; G10K 2210/3219; G10K 2210/3221; G10K 11/17875; G10K 11/17881; G10K 2210/3214; G10K 11/17825; G10K 2210/3026; G10K 11/002; G10K 11/175; G10K 11/178; G10K 11/17821; G10K 11/17823; G10K 11/17873; G10K 2210/102; G10K 2210/1081; G10K 2210/1281; G10K 2210/3016; G10K 2210/3019; G10K 2210/3028;
(Continued)

(56) References Cited

U.S. PATENT DOCUMENTS

| 7,039,197 B1* | 5/2006 | Venkatesh | H04R 3/005 |
| | | | 381/86 |
| 2013/0300648 A1* | 11/2013 | Kim | G04G 21/00 |
| | | | 345/156 |

(Continued)

OTHER PUBLICATIONS

J. Bitzer and K. Uwe Simmer, "Superdirective microphone arrays," in Microphone Arrays: Signal Processing Techniques and Applications, M. Brandstein and D. Ward, Eds. Berlin: Springer, 2001, pp. 19-38.

(Continued)

*Primary Examiner* — Lun-See Lao
(74) *Attorney, Agent, or Firm* — Bond, Schoeneck & King, PLLC

(57) ABSTRACT

A system for capturing a user's voice, including a plurality of microphones disposed about a vehicle cabin, each of the plurality of microphones generating a microphone signal, wherein the vehicle cabin defines a plurality of seating positions; a voice-activity detector configured to detect when, at least, a user seated in a target seat of the plurality of seating positions is speaking; and an adaptive beamformer configured to receive the microphone signals from the plurality of microphones and to generate, based on the microphone signals and a noise coherence matrix, an estimate of the acoustic signal at the target seating position, according to an adaptive beamforming algorithm, wherein the noise coherence matrix ceases to be updated when, according to the voice-activity detector, the user seated in the target seating position is speaking.

8 Claims, 16 Drawing Sheets

(58) Field of Classification Search
CPC ... G10K 2210/3031; G10K 2210/3038; G10K 2210/3045; G10K 2210/3046; G10K 2210/3048; G10K 2210/3226; G10K 2210/503; H04R 2499/13; H04R 27/00; H04R 5/02; H04R 1/1083; H04R 2227/009; H04R 3/02; H04R 5/04; A61N 1/025; A61N 1/0464; A61N 1/0468; A61N 1/0534; A61N 1/0556; A61N 1/0558; A61N 1/326; A61N 1/36; A61N 1/36002; A61N 1/36007; A61N 1/36053; A61N 1/36057; A61N 1/36071; A61N 1/36107; A61N 1/3611; A61N 1/36117; A61N 1/36121; A61N 1/36125; A61N 1/372; A61N 1/37205; A61N 1/37229; A61N 1/3754; A61N 1/3787; G10L 2021/02082; G10L 2021/02166; G10L 15/22; G10L 17/00; G10L 17/22; G10L 21/02; G10L 21/0208; H04L 2012/40215; H04L 67/104; H04L 67/12; H04M 9/082; H04M 1/00; H04M 1/72454; H04M 1/72463; H04M 3/568; H04S 7/302; H04S 2400/09; H04S 2400/13; H04S 7/00; H04S 7/303; H04S 7/305; A61P 11/00; A61P 17/00; A61P 17/02; A61P 21/00; A61P 25/16; A61P 25/28; A61P 27/02; A61P 39/00; H04N 5/23216; H04N 5/57; H04N 7/18; H04N 13/106; H04N 13/363; H04N 5/21; H04N 5/211; H04N 5/74; H04N 9/3182; H04N 9/3185; H04N 9/3194; H04B 10/114; H04B 10/116; H04W 24/00
USPC .................................. 381/92, 86, 56–58, 1–3
See application file for complete search history.

(56) References Cited

U.S. PATENT DOCUMENTS

2018/0359560 A1\* 12/2018 Defraene ......... G10K 11/17854
2019/0104360 A1\* 4/2019 Bou Daher ............ H04R 3/005

OTHER PUBLICATIONS

H. L. Van Trees, Optimum Array Processing. New York, NY: Wiley-Interscience, 2002, pp. 513-556.
Invitation to Pay Additional Fees, PCT Application No. PCT/US2021/071487, dated Jan. 3, 2022, pp. 1-16.
The International Search Report and the Written Opinion of the International Searching Authority, PCT Application No. PCT/US2021/071487, dated Mar. 1, 2022, pp. 1-21.
Zoran, S., et al., "Bidirectional microphone array with adaption controlled by voice activity detector based on multiple beamformers". Multimedia Tools and Applications, vol. 78, No. 11, Nov. 28, 2018, pp. 15235-15254.
Fox, C., et al., "A subband hybrid beamforming for in-car speech enhancement", Signal Processing Conference (EUSIPCO), 2012 Proceedings of the 20th European, IEEE, Aug. 27, 2012, pp. 11-15.

\* cited by examiner

SYSTEMS AND METHODS FOR ADAPTIVE BEAMFORMING

BACKGROUND

The present disclosure generally relates to systems and methods for adaptive beamforming.

SUMMARY

All examples and features mentioned below can be combined in any technically possible way.

According to an aspect, an adaptive beamforming system includes: a plurality of microphones disposed about a vehicle cabin, each of the plurality of microphones generating a microphone signal, wherein the vehicle cabin defines a plurality of seating positions; a voice-activity detector configured to detect when, at least, a user seated in a target seat of the plurality of seating positions is speaking; and an adaptive beamformer configured to receive the microphone signals from the plurality of microphones and to generate, based on the microphone signals and a noise coherence matrix, an estimate of an acoustic signal at the target seating position, according to an adaptive beamforming algorithm, wherein the noise coherence matrix ceases to be updated when, according to the voice-activity detector, the user seated in the target seating position is speaking.

In an example, the target seat is selected according to a user selection.

In an example, the target seat is selected according to which seating position of the plurality of seating positions the voice activity detector detects a user speaking.

In an example, the adaptive beamformer is further configured to cease updating the noise coherence matrix when, according to the voice-activity detector, a user in any of the plurality of seating positions is speaking.

In an example, the adaptive beamformer is further configured to calculate a plurality of noise coherence matrices, each of the plurality of noise coherence matrices being representative of a noise condition at a respective associated seating position of the plurality of seating positions, wherein each of the plurality of noise coherence matrices ceases to be updated when, according to the voice-activity detector, a user seated in the associated seating position is speaking.

In an example, the adaptive beamformer is further configured to generate an estimate of a second acoustic signal at a second target seating position, when, according to the voice-activity detector, the user seated in the target seating position is speaking and the user seated in the second target seating position is speaking, wherein the estimate of the acoustic signal and the second acoustic signal being summed together.

In an example, the adaptive beamformer is further configured to generate an estimate of the acoustic signal and a second acoustic signal at a second target seating position, according to a second adaptive beamforming algorithm, when, according to the voice-activity detector, the user seated in the target seating position is speaking and the user seating in the second target seating position is speaking.

In an example, the second adaptive beamforming algorithm is a linearly constrained minimum variance beamforming algorithm.

According to another aspect, an adaptive beamforming system includes: a plurality of microphones disposed about a vehicle cabin, each of the plurality of microphones generating a microphone signal, wherein the vehicle cabin defines a plurality of seating positions; a voice-activity detector configured to detect when a user seated in a target seating position of the plurality of seating positions is speaking; and an adaptive beamformer configured to receive the microphone signals from the plurality of microphones and to generate, based on the microphone signals and one of a first noise coherence matrix and a second noise coherence matrix, an estimate of an acoustic signal at the target seating position, according to an adaptive beamforming algorithm, wherein the first noise coherence matrix is computed by recursively summing a first previously-calculated noise coherence matrix with a first newly-calculated noise coherence matrix, wherein the first previously-calculated noise coherence matrix is weighted more heavily than the first newly-calculated noise coherence matrix, wherein coefficients of the adaptive beamformer are updated using the first noise coherence matrix when the voice-activity detector detects that the user seated in the target seating position is speaking, wherein the second noise coherence matrix is computed by recursively summing a second previously-calculated noise coherence matrix with a second newly-calculated noise coherence matrix, wherein the second previously-calculated noise coherence matrix is weighted less heavily than the second newly-calculated noise coherence matrix, wherein the coefficients of the adaptive beamforming filter are updated using the second noise coherence matrix when the voice-activity detector does not detect that the user seated in the target seating position is speaking.

In an example, the coefficients of the adaptive beamformer are updated using a historic first noise coherence matrix stored during a previous frame, wherein the historic first noise coherence matrix was stored at least a predetermined period of time before the voice-activity detector detected that the user seated in the target seating position is speaking, wherein the predetermined period of time is greater than a delay required for the voice-activity detector to detect that the target user is speaking.

According to another aspect, an adaptive beamforming system includes: a plurality of microphones disposed about a vehicle cabin, each of the plurality of microphones generating a microphone signal, wherein the vehicle cabin defines a plurality of seating positions; and an adaptive beamformer configured to receive the microphone signals from the plurality of microphones and to generate, based on the microphone signals and a noise coherence matrix, an estimate of an acoustic signal at a target seating position, according to an adaptive beamforming algorithm, wherein the noise coherence matrix is determined, at least in part, from a predetermined noise coherence matrix, the predetermined noise coherence matrix being representative of a noise condition introduced to the vehicle cabin by at least one speaker disposed in the vehicle cabin.

In an example, a gain of the predetermined noise coherence matrix is set according to a magnitude of the noise condition.

In an example, the gain of the predetermined noise coherence matrix is increased over a plurality of samples.

In an example, the predetermined noise coherence matrix is subtracted from an updated noise coherence matrix when the noise condition ceases to be introduced to the vehicle cabin, wherein the updated noise coherence matrix is an update to the noise coherence matrix according to the plurality of microphone signals.

In an example, the noise coherence matrix comprises a sum of a calculated noise coherence matrix and the predetermined noise coherence matrix, wherein the calculated noise coherence matrix is inverted from an inverted state before being summed with the predetermined noise coherence matrix.

In an example, the predetermined noise coherence matrix is retrieved as an inverted matrix.

According to another aspect, an adaptive beamforming system includes: a plurality of microphones disposed about a vehicle cabin, each of the plurality of microphones generating a microphone signal, wherein the vehicle cabin defines a plurality of seating positions; an adaptive beamformer configured to receive the microphone signals from the plurality of microphones and to generate, based on the microphone signals and a noise coherence matrix, an estimate of an acoustic signal at a target seating position, according to an adaptive beamforming algorithm, wherein an artificial white noise signal is added to each of the plurality of microphone signals such that white noise gain of the estimate of the acoustic signal is improved.

In an example, the artificial white noise signal is selected such that a minimum white noise gain is achieved across a predetermined frequency range.

In an example, the artificial white noise signal is predetermined.

In an example, the artificial white noise signal is selected from a plurality of artificial white noise signals according to the noise condition within the cabin.

In an example, the artificial white noise signal is adjusted such that a condition number of the noise coherence matrix is maintained within a predetermined range across frequency.

The details of one or more implementations are set forth in the accompanying drawings and the description below. Other features, objects, and advantages will be apparent from the description and the drawings, and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

A microphone array constitutes one of the first stages in the signal processing chain of a hands-free system disposed in a vehicle. In addition to their noise and interference rejection capability, microphone arrays lead to an improved performance of the subsequent components in the system such as the acoustic echo canceller and the residual echo suppressor due to the improved signal-to-noise ratios at their inputs. The vehicle environment is very noisy, and the use of a microphone array is thus essential to obtain an acceptable overall system performance.

Microphone arrays can be either fixed or adaptive. Fixed microphone arrays are usually easier to implement and are less computationally expensive. However, they suffer from inconsistent performance when dealing with varying noise conditions. Indeed, it is extremely difficult to design a fixed microphone that can perform well in all noise conditions. The array has the best performance when it is applied to the same noise condition it was designed for. Once the noise condition changes, however, the performance of the array starts deteriorating until it reaches a point where the array is hurting the performance instead of helping it.

Figure 1A:
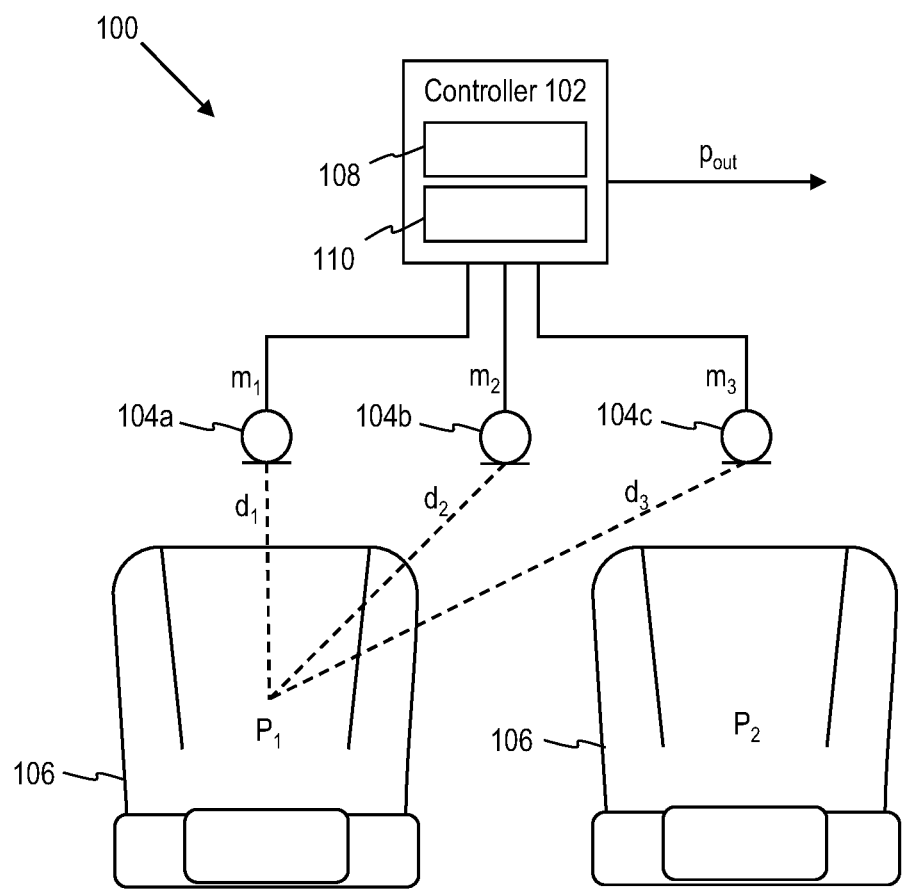
FIG. 1A depicts a schematic drawing of a vehicle cabin with a controller implementing an adaptive beamformer and microphones, according to an example.

An adaptive beamformer removes the performance degradation of a fixed beamformer by adapting the filter coefficients to the noise condition. FIG. 1A depicts an example schematic diagram of a vehicle cabin 100 featuring a controller 102 that receives multiple microphone signals $m_1$, $m_2$, $m_3$, from an array of microphones 104 and implements an adaptive beamforming algorithm to estimate an acoustic signal at at least one of the seating positions. The cabin defines a plurality of seating positions, shown in FIG. 1A as P1 and P2 respectively centered on seats 106, however any number of seating positions can be so defined (e.g., five seating positions can be defined for a five-seat passenger vehicle). Similarly, although the array of microphones 104 is shown to include only three microphones 104, the array can include any number of microphones, disposed in any location suitable for capturing speech activity within the cabin, and producing any number of microphone signals m. For the purposes of this disclosure, a microphone is any sensor receiving an acoustic signal within the vehicle cabin and transducing it into an electrical signal.

In an example, controller 102 can comprise a non-transitory storage medium 108 and processor 110. In an example, non-transitory storage medium 108 can store program code that, when executed by processor 110, implements the various filters and algorithms described below. Controller 102 can be implemented in hardware and/or software. For example, controller 102 can be implemented by a SHARC floating-point DSP processor, but it should be understood that controller 102 can be implemented by any other processor, FPGA, ASIC, or other suitable hardware.

Figure 1B:
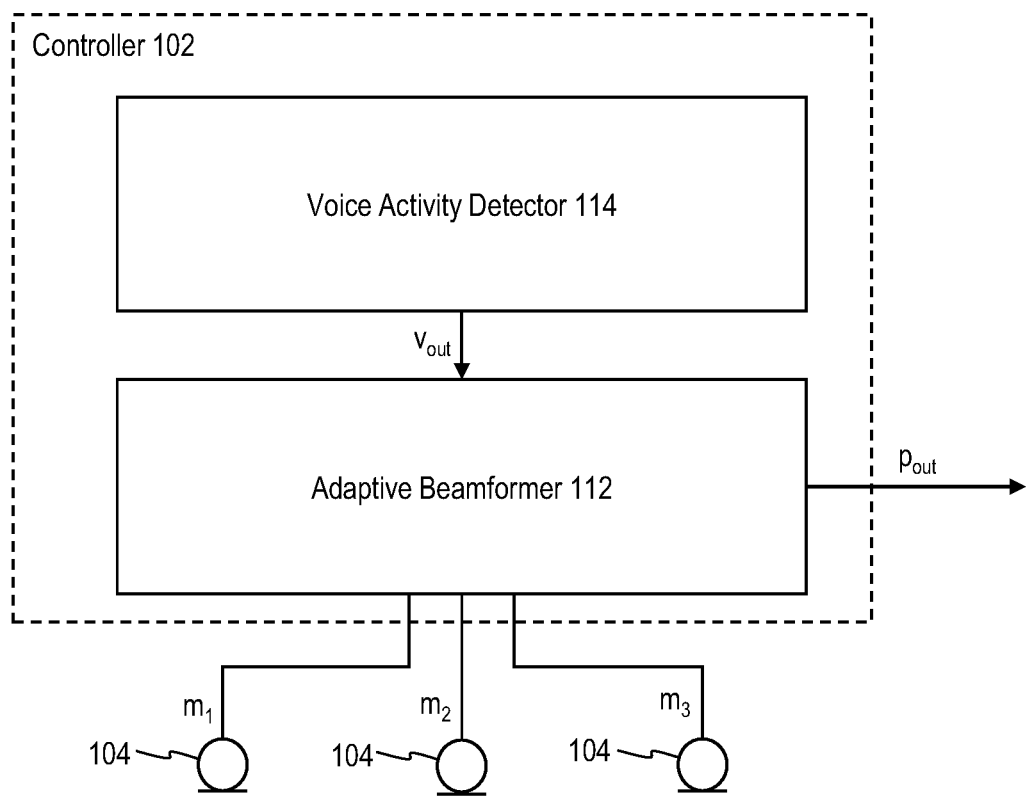
FIG. 1B depicts a schematic drawing of a controller implementing an adaptive beamformer and voice activity detector and receiving microphone signals from microphones, according to an example.

FIG. 1B depicts a block diagram of the controller 102 and microphones 104. As shown, controller 102 can implement an adaptive beamformer 112, according to an adaptive beamforming algorithm, that is configured to receive the microphone signals m and to produce an output signal $p_{out}$ representative of an estimate of the acoustic signal at at least one seating position. For the purposes of this disclosure, adaptive beamformer 112 estimates at least one acoustic signal by filtering each microphone signal m to account for the phase-shift and attenuation of the acoustic signal at the location of the respective microphone 104. In addition, adaptive beamformer 112, according to the adaptive beamformer algorithm, reduces the performance degradation of a fixed beamformer by adapting the filter coefficients to the noise condition within the cabin, such that ambient noise is reduced in the output signal $p_{out}$. Thus, the estimate of the acoustic signal is not a pure estimate, but rather one that reduces ambient noise in order to clearly reproduce a user's voice. The operation of adaptive beamformer 112 will be more fully described in connection with FIGS. 2-5, as detailed below.

As shown in FIG. 1B controller 102 can further implement voice activity detector 114. Voice activity detector 114, in one example, can receive some or all of microphone signals m and, from them, determine whether the user seated in seating position P1 is speaking (voice activity). Voice activity detector 114 can output a voice activity detection signal $v_{out}$ representing whether the user is speaking (e.g., VAD=0 or VAD=1). In addition, in some examples, voice activity detector can detect voice activity in other seating positions (e.g., seating position P2) in the vehicle. In these examples, voice activity detection signal $v_{out}$ can identify which seating position the voice activity is detected. Such a per-seat voice activity detector can detect any number of voice activities within the vehicle cabin 100, i.e., $VAD_i$, $i=1, \ldots, N_s$, where $VAD_i$ detects speech from the ith desired seat and $N_s$ is the number of desired seats.

Voice activity detection methods are generally known, and voice activity detector 114 can be implemented according to any suitable voice activity detection method. Although the voice activity detector 114 is shown implemented by controller 102, in various alternative examples, the voice activity detector can be implemented separate from controller 102.

FIGS. 2-5 depict methods featuring various improvements to adaptive beamforming. These methods are described in connection with the system of FIGS. 1A and 1B; however it should be understood that the steps of the methods of FIGS. 2-5 can be implemented by any suitable system for adaptive beamforming.

Figure 2A:
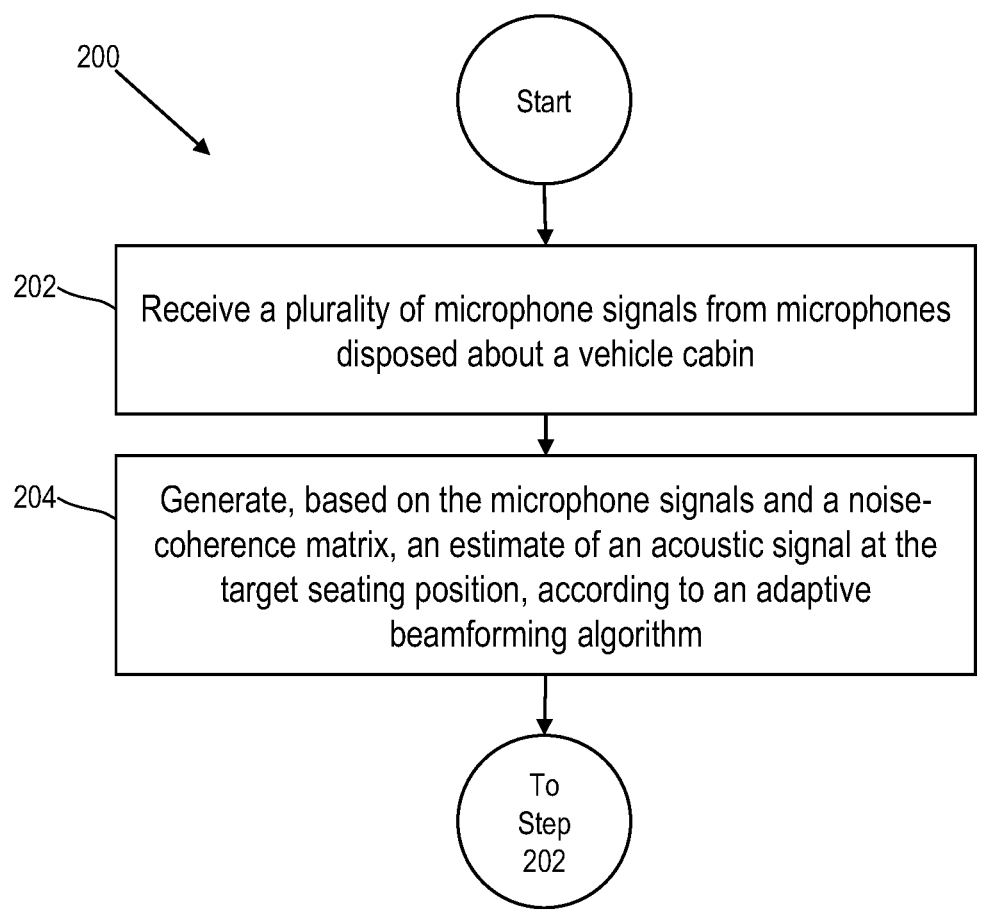
FIG. 2A depicts a method for adaptive beamforming in which a noise coherence matrix is updated when a voice activity detector detects that at least one user is not speaking, according to an example.

Turning first to FIG. 2A there is shown a method 200 for adaptive beamforming in which a noise coherence matrix is only updated when a user in a target seat is not speaking. At step 202, a plurality of microphone signals m are received from microphones 104 disposed about the vehicle cabin 100. At step 204, adaptive beamformer 112 employs these microphone signals to generate, based on a noise coherence matrix, an estimate of an acoustic signal at the target seating position according to an adaptive beamforming algorithm. (It should be understood that the "target seating position" can refer to any seating position within the vehicle.)

For example, when the user at seating position $P_1$ is speaking, each microphone 104 will receive an acoustic signal resulting from the user speech that is affected by the path from the user at seating position $P_1$ and the respective microphone 104. The nature of this path (e.g., including the length of the path and any obstructions positioned within the path) will dictate some change in the relative magnitude and phase of each microphone signal m. As shown in FIG. 1A, microphone 104a, producing microphone signal $m_1$, is disposed at a location some distance $d_1$ from seating position $P_1$. Likewise, microphone 104b is disposed at a location some distance $d_2$ from seating $P_1$, and microphone 104c is disposed at a location some distance $d_3$ from seating position $P_1$. Assuming that the path from the microphone 104a and 104c to seating position $P_1$ is clear of any obstructions, because distance $d_1$ is shorter than distance $d_3$, microphone 104a will experience attenuation and phase shift of the acoustic signal that is relatively smaller than the attenuation and phase shift of the same acoustic signal received at microphone 104b. Adaptive beamformer 112, in effect, filters each microphone signal m to remove the attenuation and phase shift resulting from the path from seating position $P_1$ to the respective microphone. In this way, microphone signal $m_3$ is filtered to remove the attenuation and phase shift of the acoustic signal at microphone 104c as a result of the acoustic signal traveling distance $d_3$, microphone signal $m_2$ is filtered to remove the attenuation and phase shift of the acoustic signal at microphone 104b as a result of the acoustic signal traveling distance $d_2$, and microphone signal $m_1$ is filtered to remove the attenuation and phase shift of the acoustic signal at microphone 104a as a result of the acoustic signal traveling distance $d_1$. To the extent that the path between seating position $P_1$ is not clear of obstructions, the attenuation and phase shift induced by the obstruction can also be estimated and accounted for in the filter.

Alternatively, one microphone, such as microphone 104a, can serve as a reference microphone for seating position $P_1$ and every other microphone can be filtered to account to the relative attenuation and phase shift to microphone signal $m_1$. Thus, microphone $m_2$ can be filtered to remove the attenuation and phase shift with respect to microphone signal $m_1$ and microphone $m_3$ can be filtered to remove the attenuation and phase shift with respect to microphone signal $m_1$. In this case, adaptive beamformer 112 estimates the magnitude and phase relationship between each microphone and filters each microphone signal m to constructively align the microphone signal m with a reference microphone signal in magnitude and phase.

In either example—i.e., accounting for the unique transfer function from each microphone and the seating position or accounting for the magnitude and phase relationship between each microphone and a reference microphone—the adaptive beamformer 112 is considered to steer a beam toward seating position $P_1$ to estimate the acoustic signal of the user seated there. Further, each microphone signal must be filtered uniquely for each frequency, as the attenuation and phase shift change across frequency. In addition, adaptive beamformer 112 can account for reflections within the vehicle cabin resulting from the user speaking at seating position $P_1$. For example, speech from a user seated at seating position $P_1$ will generate reflections from the windows, ceiling, etc. To account for these reflections, adaptive beamformer 112 can steer additional beams toward the source of the reflections in the same manner that a beam was steered toward the seating position. Adaptive beamformer 112 can thus account for the accumulation of all sources of the desired speech signal. (The above example is described for a target seat $P_1$, however, any seat within the vehicle can similarly serve as the target seat at which the acoustic signal is estimated.)

As described above, fixed beamformer performance and the quality of estimated speech will degrade in the presence of noise within the vehicle cabin. Adaptive beamforming algorithms reduce the performance degradation of a fixed beamformer by adapting the filter coefficients to the noise condition within the cabin. One such adaptive beamformer algorithm is a minimum variance distortionless response (MVDR). The MVDR design coefficients at the kth frequency bin can be obtained as follows:

$$w^H(k) = \frac{C_{nn}^{-1}(k) \cdot d(k)}{d^H(k) \cdot C_{nn}^{-1}(k) \cdot d(k)}, \quad (1)$$

where $C_{nn}(k)$ is an N×N noise coherence matrix at frequency k, with N being the number of microphones, and d(k) is the steering vector of the desired source at the same frequency. As described above, the steering vector is the representation of the delays and the attenuations which depends on the locations of the microphones and the desired source. The noise coherence matrix represents the detected noise condition for the current sample.

In practice, d(k) and the initial $C_{nn}(k)$ can be generated from recordings of the desired and undesired sources in the vehicle. Using the recordings instead of the free-field equations results in a more robust design since the recordings incorporate the reflections and transfer functions in the vehicle. Steering vector d(k) is measured a priori using recordings of the desired signal and stored in the memory. This is possible since the desired source location (e.g. driver seat) does not undergo a large change over time. The noise coherence matrices, by contrast, are updated regularly to track the noise condition. The noise coherence update equation is expressed as follows:

$$C_{nn}(k,n) = \lambda(k) \cdot C_{nn}(k,n-1) + [1-\lambda(k)] \cdot x(k,n) \cdot x^H(k,n), \quad (2)$$

where $\lambda(k)$ is a forgetting factor which controls the speed of adaptation, $C_{nn}(k,n)$ is the updated noise coherence matrix at the kth frequency bin, $C_{nn}(k,n-1)$ is the previous noise coherence matrix, and x(k,n) is the received signal vector at the current frame. The noise coherence matrix can thus be updated recursively using the previously calculated noise coherence matrix and a newly calculated noise coherence matrix.

The forgetting factor $\lambda(k)$ controls the speed of convergence at the frequency bin k. $\lambda(k)$ provides a tradeoff between the speed of convergence to the correct noise condition and the long-term performance of the algorithm, especially in the presence of speech activity.

The matrix inversion of the noise coherence matrix (i.e., $C_{nn}^{-1}(k)$) of Eq. (1) has to be done for each frequency. For a large number of microphones 104 or for a large number of FFT points, this results in a high computational complexity. Using the matrix inversion lemma, a more efficient implementation of the matrix inversion can be implemented. Accordingly, the inverse of the noise coherence can be computed as follows $$C_{nn}^{-1}(k,n) = \lambda(k)^{-1} \cdot C_{nn}^{-1}(k,n-1) - \Delta C_{nn}^{-1}(k,n) \quad (3)$$

where $C_{nn}^{-1}(k,n-1)$ is the inverse of the noise coherence matrix at the previous frame and $\Delta C_{nn}^{-1}(k,n)$ is expressed as follows:

$$\Delta C_{nn}^{-1}(k,n) = \frac{\lambda(k)^{-2} \cdot C_{nn}^{-1}(k,n-1) \cdot [1-\lambda(k)] \cdot x(k,n) \cdot x^H(k,n) \cdot C_{nn}^{-1}(k,n-1)}{1 + \lambda(k)^{-1} \cdot [1-\lambda(k)] \cdot x^H(k,n) \cdot C_{nn}^{-1}(k,n-1) \cdot x(k,n)}. \quad (4)$$

Eqs. (3) and (4) can thus be used to recursively calculate the inverse of the noise coherence matrix in a more efficient manner.

The noise coherence matrix in Eqs. (1)-(2) can be initialized to a known noise coherence matrix, i.e. $C_{nn}(k,0) = C_{nn}(k,\text{init})$, $k=1 \ldots N_f$, where $N_f$ is the number of frequency points and $C_{nn}(k,\text{init})$ is a noise coherence matrix that is computed a priori (i.e., predetermined) for the expected noise condition in the vehicle. In a similar fashion, if the matrix inversion lemma is used to update the inverse of the noise coherence matrix (Equations (3)-(4)), $C_{nn}^{-1}(k,0)$ can be initialized to the known noise condition, i.e. $C_{nn}^{-1}(k,0) = C_{nn}^{-1}(k,\text{init})$. In one example, the predetermined noise coherence matrix and inverse noise coherence matrix can be factory default values that are selected to work well for most noise situations. In an alternative example, the noise coherence matrix and inverse noise coherence matrix can be stored in a non-transitory storage medium (e.g., non-transitory storage medium 108) at predetermined intervals or when the vehicle is turned off. When the noise coherence matrix and the inverse noise coherence matrix is initialized, the most recent stored noise coherence matrix and inverse noise coherence matrix is retrieved from storage and used. In an alternative example, only one of the noise coherence matrix or inverse noise coherence matrix is stored and retrieved from storage and inverted to arrive at the other. Once the noise coherence matrix and the inverse noise coherence matrix is initialized, these values are updated, as described above, to track the actual noise condition.

However, continuing to update the noise coherence matrix in the presence of the desired signal (i.e., voice activity at the target seat) would result in the undesired nulling of the acoustic voice signal. To circumvent this, the noise coherence matrix can be only updated in the absence of the desired signal as shown in the following equation:

$$C_{nn}(k,n) = \quad (5)$$

-continued $$\begin{cases} \lambda(k) \cdot C_{nn}(k, n-1) + [1 - \lambda(k)] \cdot x(k, n) \cdot x^H(k, n), & VAD = 0 \\ C_{nn}(k, n-1), & VAD = 1 \end{cases}$$

Stated differently, in the absence of voice activity (i.e., VAD=0), the received signals m from microphones 104 are a good representation of the noise, and updating the noise coherence matrix will, accordingly, track the current condition of the noise, as in Eq. (2). On the other hand, in the presence of voice activity (VAD=1), the received signal from microphones 104 consists of both speech and noise and, as a result, is not a good representation of the noise. Accordingly, in the presence of voice activity, the noise coherence matrix from the previous sample is set as the noise coherence matrix for the present sample. Likewise, for each successive sample in which the voice activity continues, the noise coherence matrix from the previous sample is set as the current noise coherence matrix. Thus, the noise coherence matrix calculated before the start of the voice activity is used for the duration of the detected voice activity. Once the voice activity ceases, the noise coherence matrix is again updated according to Eq. (5).

As described above, the matrix inversion lemma can be used to calculate the inverse of the noise coherence matrix in a more efficient manner. Using the voice activity detection to prevent updating the inverse of the noise coherence matrix in the presence of the desired signal using the matrix inversion lemma becomes:

$$C_{nn}^{-1}(k, n) = \begin{cases} \lambda(k)^{-1} \cdot C_{nn}^{-1}(k, n-1) - \Delta C_{nn}^{-1}(k, n), & VAD = 0 \\ C_{nn}^{-1}(k, n-1), & VAD = 1 \end{cases} \quad (6)$$

where $\Delta C_{nn}^{-1}(k,n)$ is calculated according to Eq. (4).

Figure 2B:
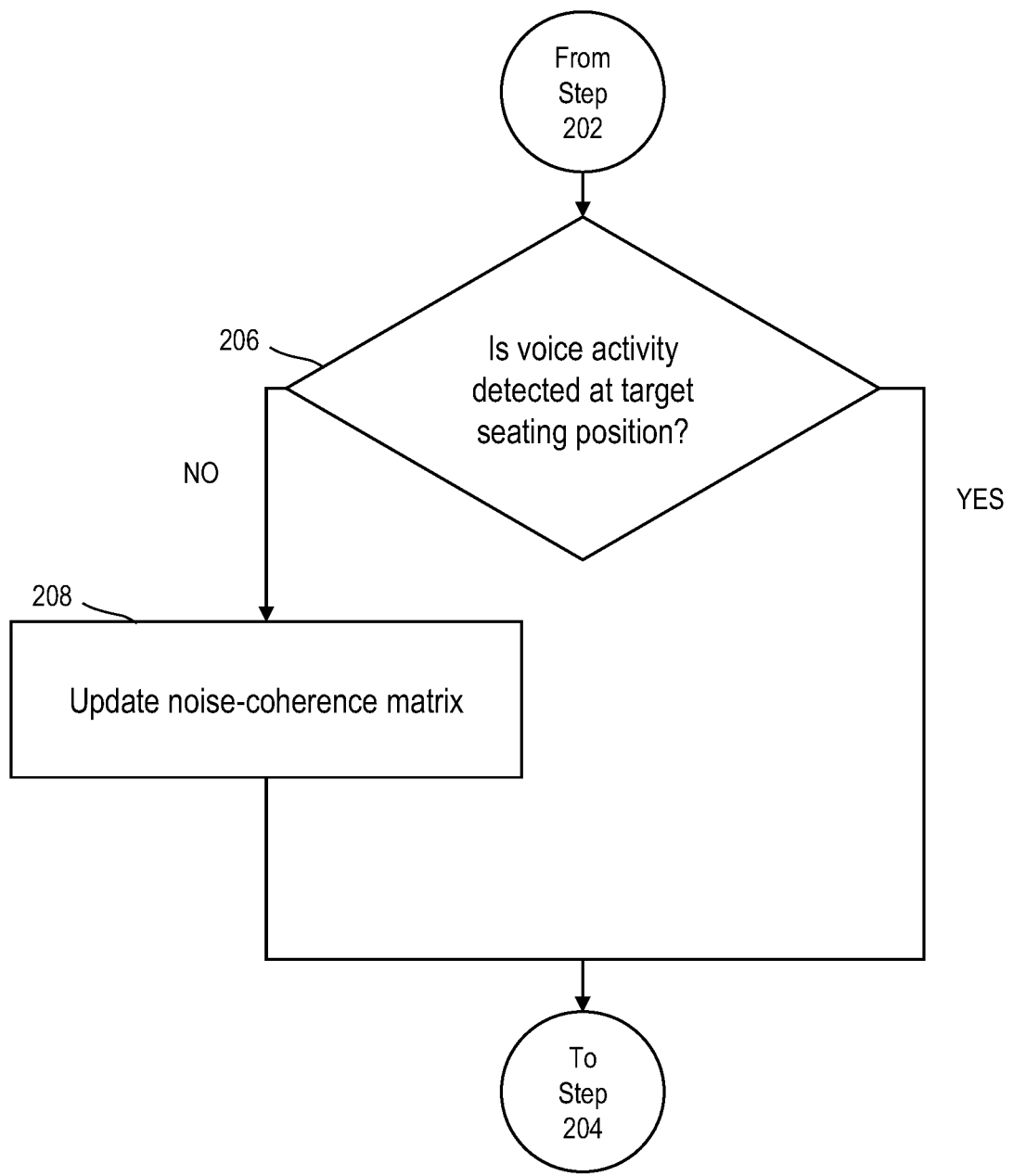
FIG. 2B depicts a method for adaptive beamforming in which a noise coherence matrix is updated when a voice activity detector detects that at least one user is not speaking, according to an example.

FIG. 2B depicts the steps of updating the noise-coherence matrix when the user in the target seat is speaking. At step 206, conditional step 206 asks whether voice activity is detected at the target seating position. If not, the noise coherence matrix is updated according to the noise detected at the current sample (see., e.g., Eq. (12)). Otherwise, method 200 proceeds to step 204 without updating noise coherence matrix (that is, the previously calculated noise coherence matrix is used).

The formulation above using the voice-activity detection can be extended to cover multiple seats in the vehicle. In other words, adaptive beamformer 112 can be configured to detect an acoustic signal at more than one seat in the vehicle.

Figure 2C:
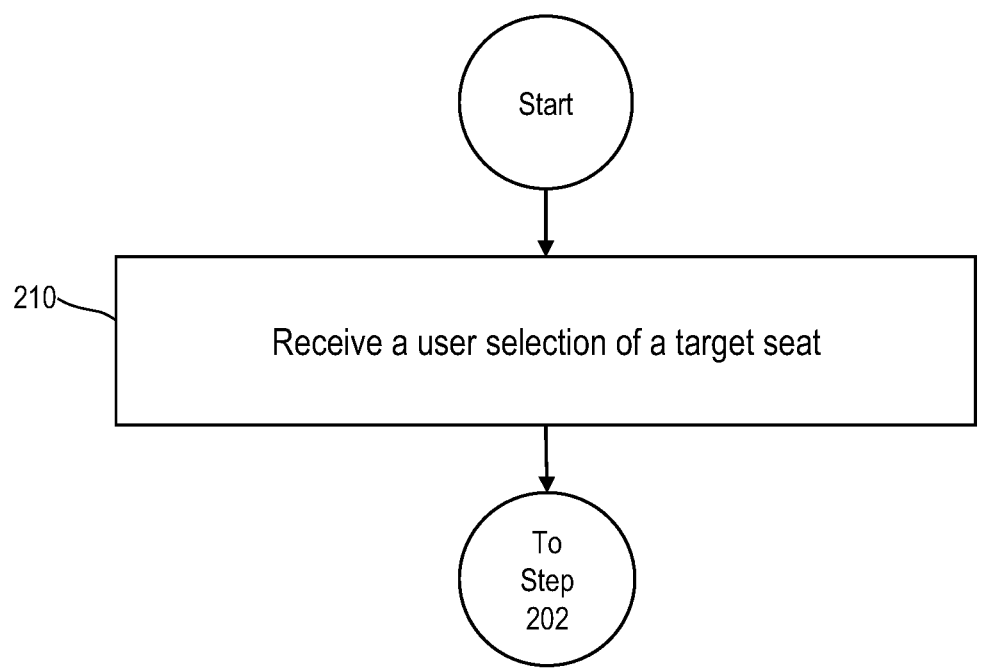
FIG. 2C depicts a method for adaptive beamforming in which a noise coherence matrix is updated when a voice activity detector detects that at least one user is not speaking, according to an example.

Generally, the steering vectors per seat, i.e. $d_i(k)$, can be computed a priori and stored in the memory, as the location of the seats does not substantially vary. In one example, a user can have the ability to select the target seat, and as a result, the corresponding steering vectors are used in the equation. Thus, if the seating position P2 is selected, the steering vectors for seating position P2 are used in Eq. (1). Whereas, if seating position $P_1$ is selected, the steering vectors for seating position P1 are used in Eq. (1). This is depicted in the flowchart of FIG. 2C, which shows, at step 210, preceding step 202, a user selection of a target seat is received. This user selection determines the target seat for which the acoustic signal is estimated at step 204. The user selection can be received according to any suitable user interface (e.g., using a touchscreen in the vehicle).

Figure 2D:
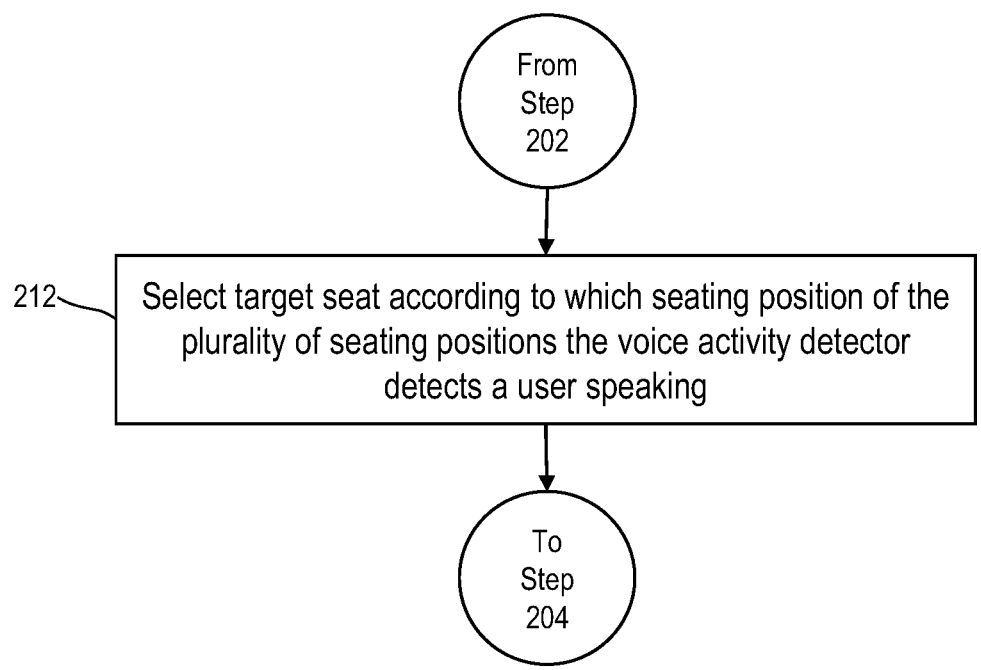
FIG. 2D depicts a method for adaptive beamforming in which a noise coherence matrix is updated when a voice activity detector detects that at least one user is not speaking, according to an example.

In a second example, the selected steering vectors can be chosen based on the active speech location. In other words, when speech is detected from a particular seat i ($VAD_i=1$), the corresponding steering vectors are used. Thus, in a two-seat example, Eq. (1) is modified as follows:

$$w^H(k) = \begin{cases} \dfrac{C_{nn}^{-1}(k) \cdot d_1(k)}{d_1^H(k) \cdot C_{nn}^{-1}(k) \cdot d_1(k)} & VAD_1 = 1 \\ \dfrac{C_{nn}^{-1}(k) \cdot d_2(k)}{d_2^H(k) \cdot C_{nn}^{-1}(k) \cdot d_2(k)} & VAD_2 = 1 \end{cases} \quad (7)$$

where $d_1$ is the steering vector associated with the first seating position P1 and $d_2$ is the steering vector associated with the second seating position P2. Thus, the target seat at which the acoustic signal is estimated is determined according to which seat voice activity is detected. Of course, this can be expanded for any number of seats—two seats are only provided as an example. This is depicted in FIG. 2D, in which at step 212 the target seat (selected according to the steering vector) is selected according to which seating position the voice activity detector detects a user speaking.

If speech is active in more than one seat, (for example, both $VAD_1=1$ and $VAD_2=1$) the filter coefficients can be given by the sum of equations of Eq. (7). That is, the coefficients can be given sum of $w^H(k)$ calculated for each steering vector $d_1$, $d_2$ as follows:

$$w^H(k) = \frac{C_{nn}^{-1}(k) \cdot d_1(k)}{d_1^H(k) \cdot C_{nn}^{-1}(k) \cdot d_1(k)} + \frac{C_{nn}^{-1}(k) \cdot d_2(k)}{d_2^H(k) \cdot C_{nn}^{-1}(k) \cdot d_2(k)} \quad (8)$$

Figure 2E:
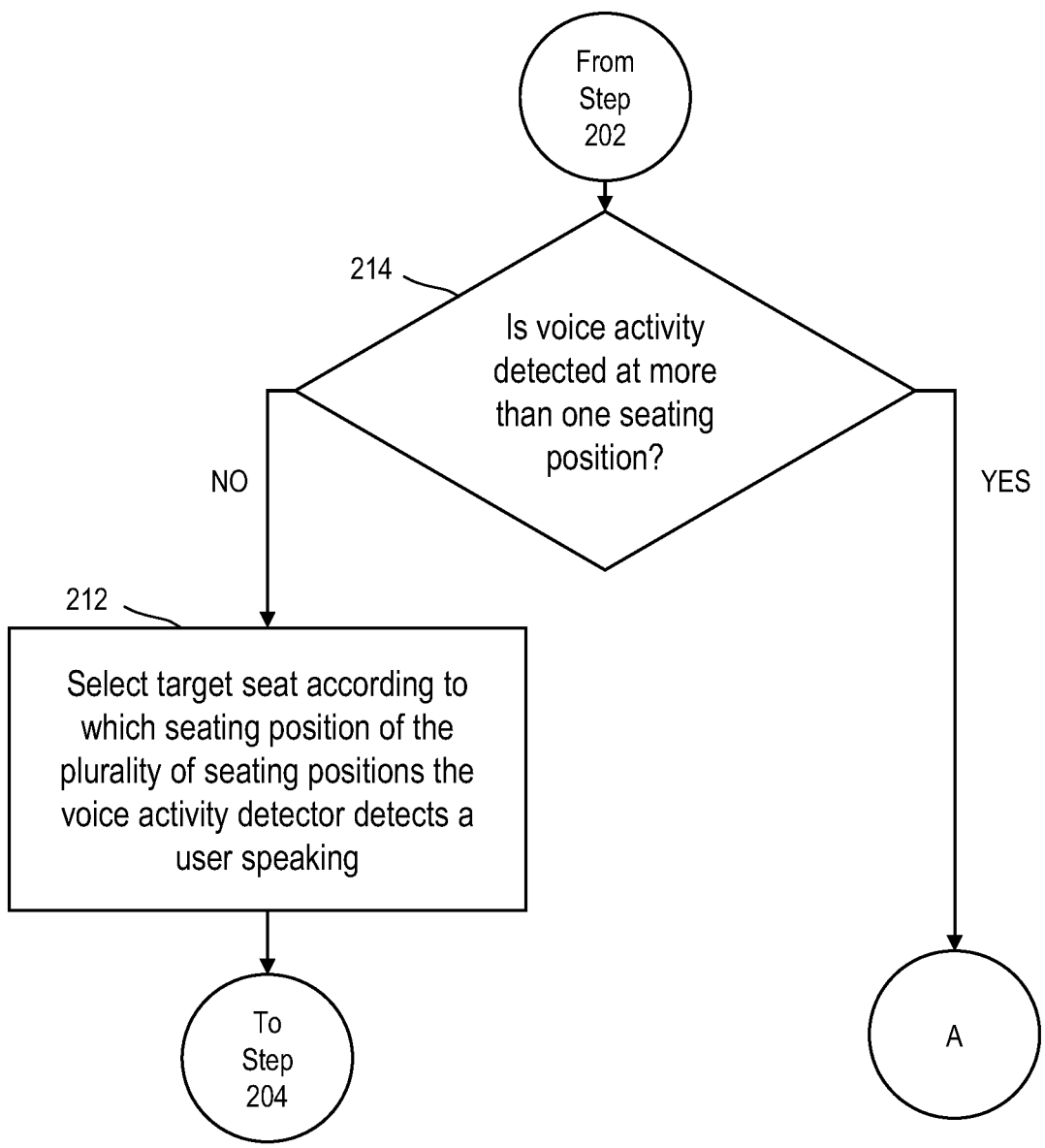
FIG. 2E depicts a method for adaptive beamforming in which a noise coherence matrix is updated when a voice activity detector detects that at least one user is not speaking, according to an example.
Figure 2F:
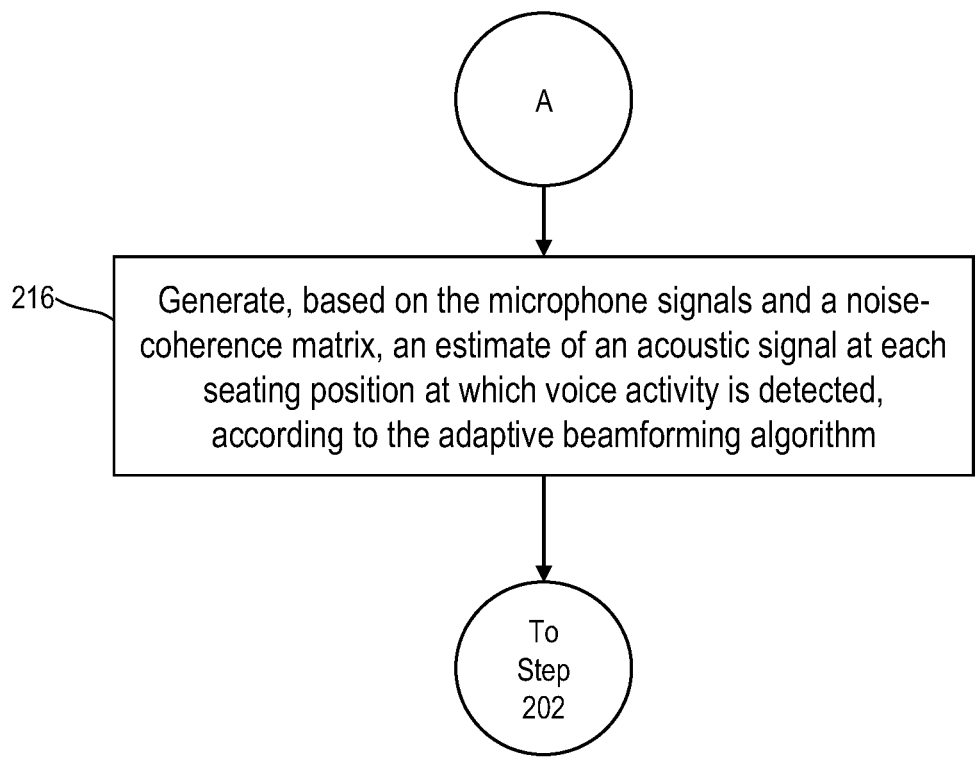
FIG. 2F depicts a method for adaptive beamforming in which a noise coherence matrix is updated when a voice activity detector detects that at least one user is not speaking, according to an example.

This likewise can be extended for any number of active speakers within the vehicle. For example, as depicted in FIGS. 2E-2F, if, at conditional step 214, voice activity is detected at only one seating position (i.e., branch NO) the target seat is selected according to which seating position voice activity is detected, as described above in connection with step 212. However, if voice activity is detected at more than one seating position, at step 216 (FIG. 2F), an estimate of each acoustic signal at seating position at which voice activity is detected is generated according to the adaptive beamforming algorithm. These estimates can be summed together, e.g., as described in Eq. (8) above.

Figure 2G:
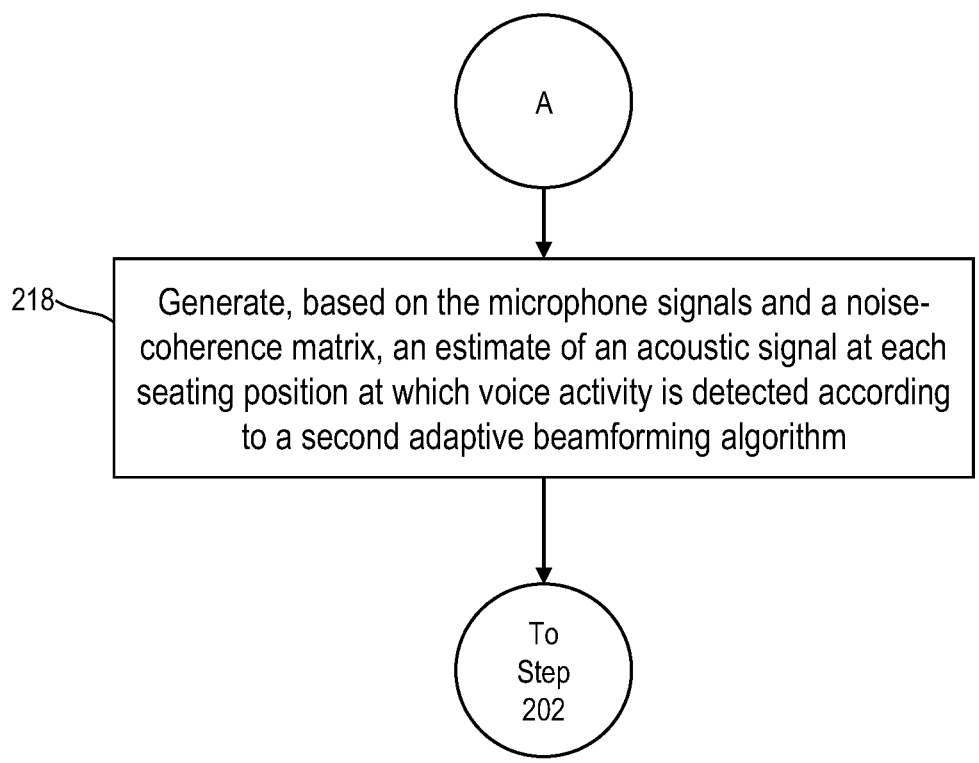
FIG. 2G depicts a method for adaptive beamforming in which a noise coherence matrix is updated when a voice activity detector detects that at least one user is not speaking, according to an example.

Alternatively, as shown in step 218 of FIG. 2G, a different beamforming algorithm can be implemented if speech is active in more than one seat. For example, a linearly constrained minimum variance (LCMV) formulation can be used instead of MVDR. Thus, if speech is active in only one seat, MVDR can be used according to, for example, Eq. (7) and step 212; however, if speech is active in more than one seat, LCMV (which is adapted to estimate more than one acoustic signal) can be used to estimate the speech of multiple speakers.

With regard to updating the noise coherence matrix when one of multiple seats can be selected, in one example, common noise coherence matrices can be employed across all desired seats that are updated when the voice activity detectors show speech is absent (i.e., $VAD_i=0$, $i=1 \ldots N_s$). This method reduces the required memory and computational complexity. However, it does not allow cancellation of speech at any of the other desired seats when a user at a selected seat position is speaking.

Alternatively, noise coherence matrices per seat, i.e. $C_{i,nn}(k,n)$ can be calculated. For example, when seating position P1 is selected as the target seat, a noise coherence matrix $C_{1,nn}(k)$ for the first seating position is used, which cancels speech at other seating positions; whereas, when seating position P2 is selected as the target seat, a noise coherence matrix $C_{1,nn}(k)$, which cancels speech at other seating positions is used. Each noise coherence matrix can be updated when the corresponding voice activity detector shows absence of speech. Thus, for example, $C_{1,nn}(k)$ can be updated when $VAD_1=0$, $C_{2,nn}(k)$ can be updated when $VAD_2=0$, etc.

As described above, a smaller forgetting factor $\lambda(k)$ results in faster tracking of the noise condition, but at the expense of speech degradation during speech activity. On the other hand, a larger forgetting factor adapts slower to changes in the noise condition but has less speech distortion.

Stated differently, a small forgetting factor results in a short memory which results in a faster convergence to the current noise condition. However, when speech activity starts, the noise coherence matrix is locked to the last computed value before the onset of speech. This value is no longer a good representation of the noise condition during speech activity due to the aggressive tracking that was used. On the other hand, choosing a larger forgetting factor results in a slower convergence to the current noise. However, due to the large amount of averaging, when speech activity starts, the last computed noise coherence matrix can perform well during the entirety of the speech segment.

For example, a noise from the vehicle hitting a bump in the road or some other rapid transient noise will have a larger impact on a noise coherence matrix with a smaller forgetting factor than on the noise coherence with the larger forgetting factor. As a result, a noise coherence matrix update with small forgetting factor will generally do a better job adapting to the rapid transient than the noise coherence matrix update with a larger forgetting factor. However, if speech is begun directly after the rapid transient noise, the noise coherence matrix will freeze for the duration of the speech having adapted to the transient noise, which is no longer indicative of the noise condition within the vehicle cabin. Thus, using the noise coherence matrix update with small forgetting factor works better for cancelling noise when the user is not speaking, but the noise coherence matrix update with large forgetting factor results in a more consistent results when the user is speaking.

Accordingly, the benefits of having a small forgetting factor and a large forgetting factor can be combined by computing two noise coherence matrices, one noise coherence matrix with a smaller forgetting factor and another with a larger forgetting factor, for each frequency bin, as shown in the following equations:

$$C_{nn,1}(k, n) = \quad (9)$$
$$\begin{cases} \lambda(k) \cdot C_{nn,1}(k, n-1) + [1 - \lambda(k)] \cdot x(k, n) \cdot x^H(k, n), & VAD = 0 \\ C_{nn,1}(k, n-1), & VAD = 1 \end{cases}$$

$$C_{nn,2}(k, n) = \quad (10)$$
$$\begin{cases} \lambda(k) \cdot C_{nn,2}(k, n-1) + [1 - \lambda(k)] \cdot x(k, n) \cdot x^H(k, n), & VAD = 0 \\ C_{nn,2}(k, n-1), & VAD = 1 \end{cases}$$

where $\lambda_1(k)$ is a smaller forgetting factor and $\lambda_2(k)$ is a larger forgetting factor. It should be understood that, in this disclosure, "smaller" and "larger" forgetting factors are relative to each other. Thus, the smaller forgetting factor is smaller than the larger forgetting factor, and the larger forgetting factor is larger than the smaller forgetting factors.

Equation (1) is modified to reflect the change as follows:

$$w^H(k) = \begin{cases} \dfrac{C_{nn,1}^{-1}(k) \cdot d(k)}{d^H(k) \cdot C_{nn,1}^{-1}(k) \cdot d(k)}, & VAD = 0 \\ \dfrac{C_{nn,2}^{-1}(k) \cdot d(k)}{d^H(k) \cdot C_{nn,2}^{-1}(k) \cdot d(k)}, & VAD = 1 \end{cases} \quad (11)$$

Thus, in the absence of speech activity, $C_{nn,1}(k)$ (calculated with the smaller forgetting factor) is used to update the filter coefficients which results in a faster adaptation to the noise change and better interference cancellation. In the presence of speech activity, $C_{nn,2}(k)$ (calculated with the larger forgetting factor) is used to update the filter coefficients which results in less speech degradation at the expense of a slightly lower interference cancellation.

Figure 3A:
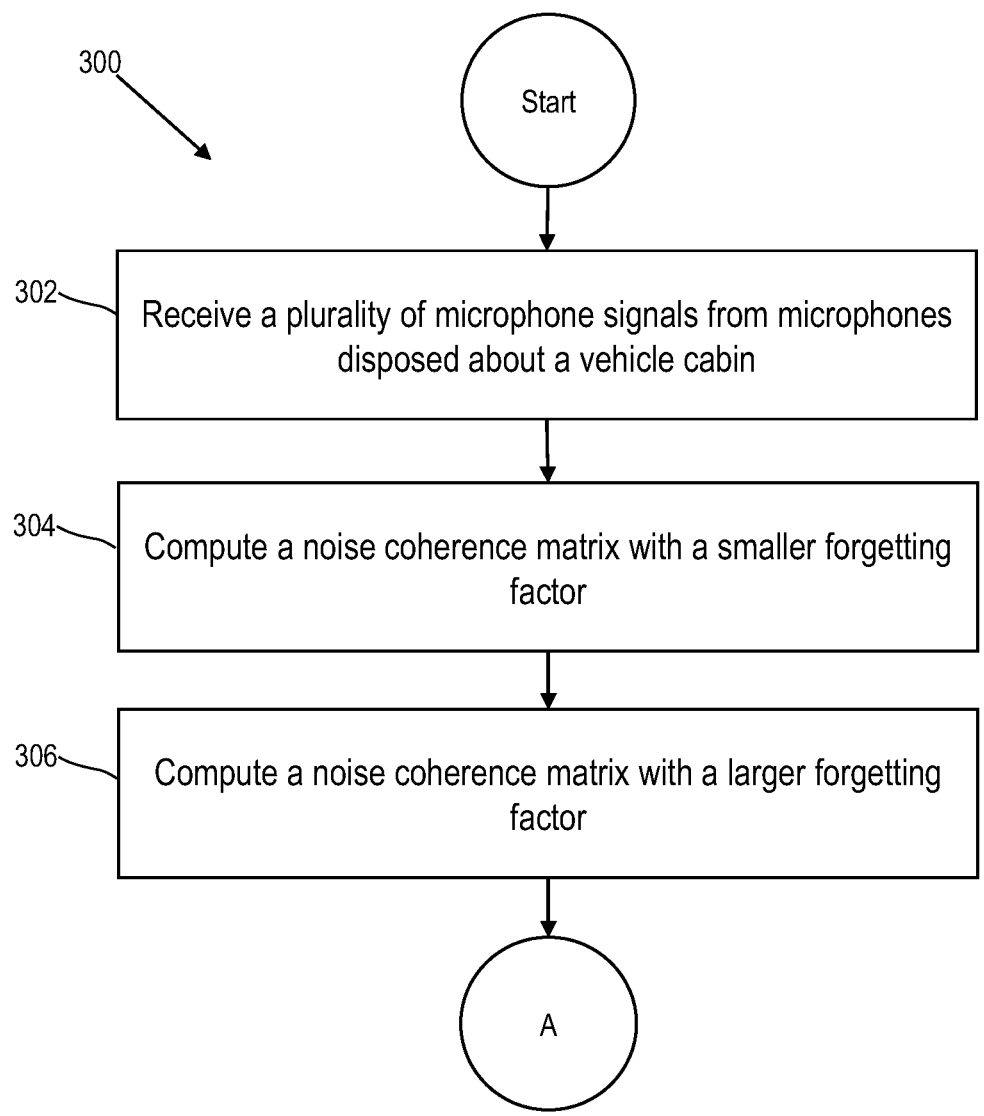
FIG. 3A depicts a method for adaptive beamforming in which noise coherence matrices with variable forgetting factors are selected according to the voice activity detector of a least one user, according to an example.
Figure 3B:
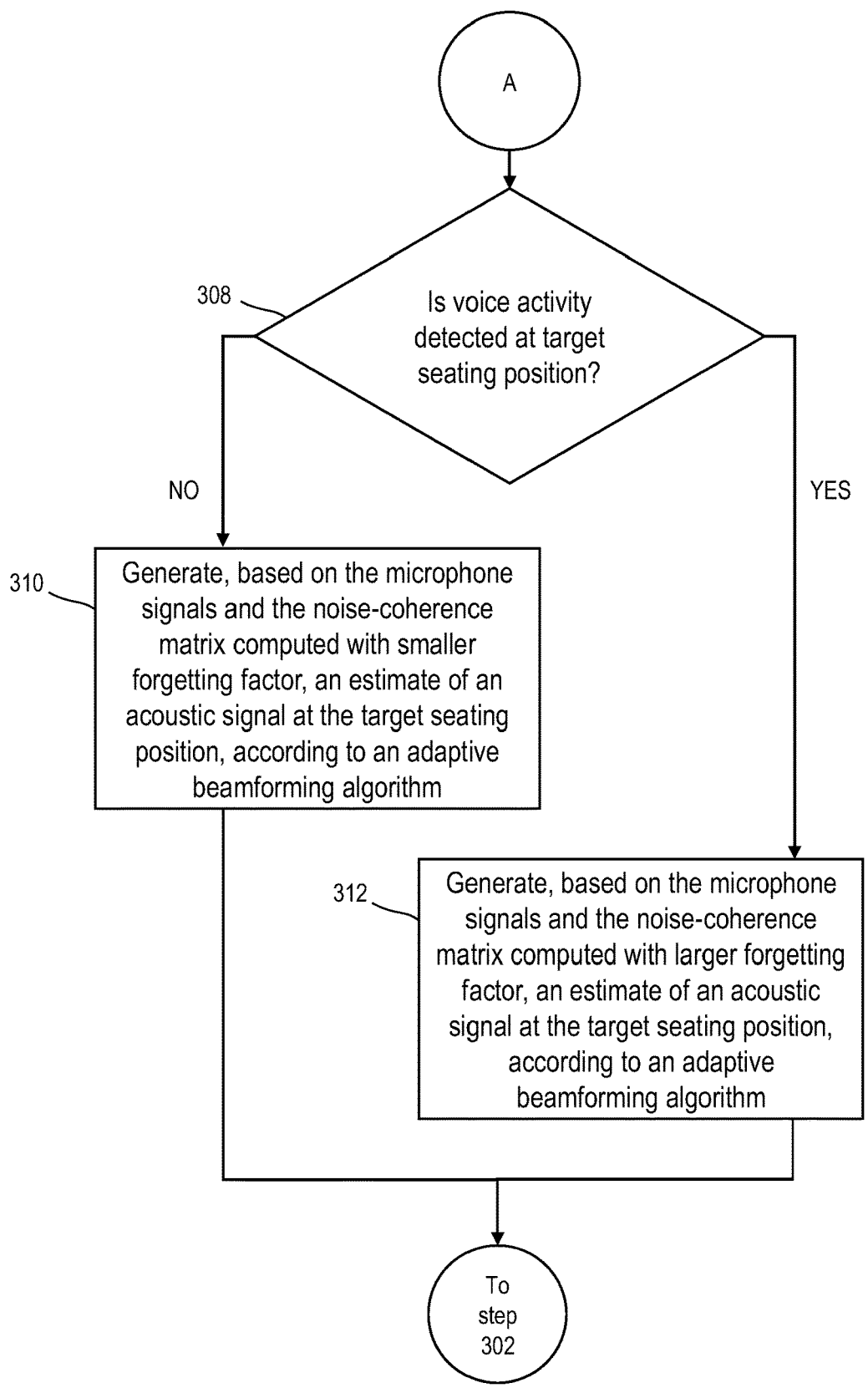
FIG. 3B depicts a method for adaptive beamforming in which noise coherence matrices with variable forgetting factors are selected according to the voice activity detector of a least one user, according to an example.
Figure 3C:
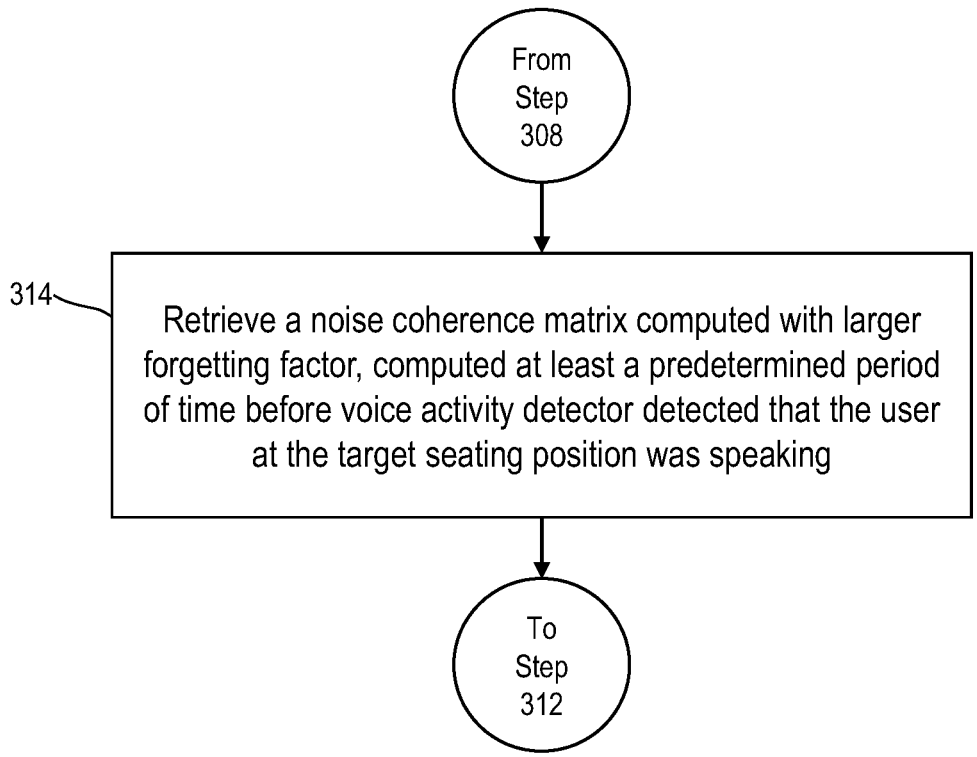
FIG. 3C depicts a method for adaptive beamforming in which noise coherence matrices with variable forgetting factors are selected according to the voice activity detector of a least one user, according to an example.

This is shown in method 300 depicted in FIGS. 3A-3C, in which, at step 304 and 306, noise coherence matrices with smaller and larger forgetting factors are calculated. These can be computed according to Eqs. 9 and 10 above, respectively. At step 308, it is determined whether voice activity is detected at the target seat. If not, then at step 310, the acoustic signal is estimated at the target seat, based on the microphone signals m and the noise coherence matrix computed with the smaller forgetting factor. However, if voice activity is detected at the target seat, then at step 310, the acoustic signal is estimated at the target seat, based on the microphone signals and the noise coherence matrix computed with the larger forgetting factor.

As described above, the noise coherence matrix can be configured to be only updated in the absence of speech activity. A robust speech activity detector is required to prevent adaptation during speech segments. Unfortunately, it is impossible to identify the presence of speech before it occurs or even in the same sample in which it begins. The speech activity state will always be identified after its onset. To address this issue, a history of noise coherence matrices computed at previous frames can be stored in the memory. For example, let $\Delta t$ be the time the speech activity detector needs to identify speech activity. Once a speech activity state is detected, a previously stored noise coherence matrix computed at least $\Delta t$ before the identification of speech activity can be loaded from the memory (e.g., RAM) and used in the computation of the filter coefficients while speech is ongoing. Generally speaking, only enough previously calculated noise coherence matrices need to be stored to permit retrieving a previously stored noise coherence matrix computed at some time $\Delta t$ before the detection of speech.

This can be combined with the example described above, storing noise coherence matrices with large and small forgetting factories by storing a history of noise coherence matrices with long forgetting factors. Once the user begins speaking, the noise coherence matrix with longer forgetting factor computed at least some length of time $\Delta t$ before the identification of speech activity can be loaded from the memory and used in the computation of the filter coefficients.

This is depicted in step 314 of FIG. 3C, in which after voice activity is detected at the target seat in step 308, a noise coherence matrix computed with a larger forgetting factor, having been calculated at some point in time before the detection of the voice activity, is retrieved. This retrieved noise coherence matrix computed with larger forgetting factor is used to estimate the acoustic signal at the target seat in step 312.

In addition to the noise coherence matrix computed with larger forgetting factor, the noise coherence matrix computed with smaller forgetting factor will be similarly corrupted by the user's voice activity before the voice activity detector has detected the user's speech. Thus, when speech activity ceases, a previously stored noise coherence matrix computed with smaller forgetting factor can be retrieved from memory and used to estimate the acoustic signal at step 310. The retrieved noise coherence matrix computed with smaller forgetting factor can be computed at some time before the identification of speech activity. Like the above example, retrieving the noise coherence matrix with smaller forgetting factor requires storing a history of noise coherence matrices computed with smaller forgetting factors, such that one such noise coherence matrix computed at least some length of time $\Delta t$ before the detection of the user's voice activity can be retrieved. In most cases, this retrieved noise coherence matrix computed with smaller forgetting factor will be computed during the same sample that the retrieved noise coherence matrix with larger forgetting factor (e.g., at step 314) is computed; however, in some examples, the retrieved noise coherence matrices can be computed during different samples. Once the noise coherence matrix computed with smaller forgetting factor is retrieved, it can either be used as the noise coherence matrix (e.g., as $C_{nn,1}(k)$ in Eq. (9)) or to initialize the noise coherence matrix (e.g., as $C_{nn,1}(k,n-1)$ in Eq. (9)) for the sample following the end of user speech.

Figure 3D:
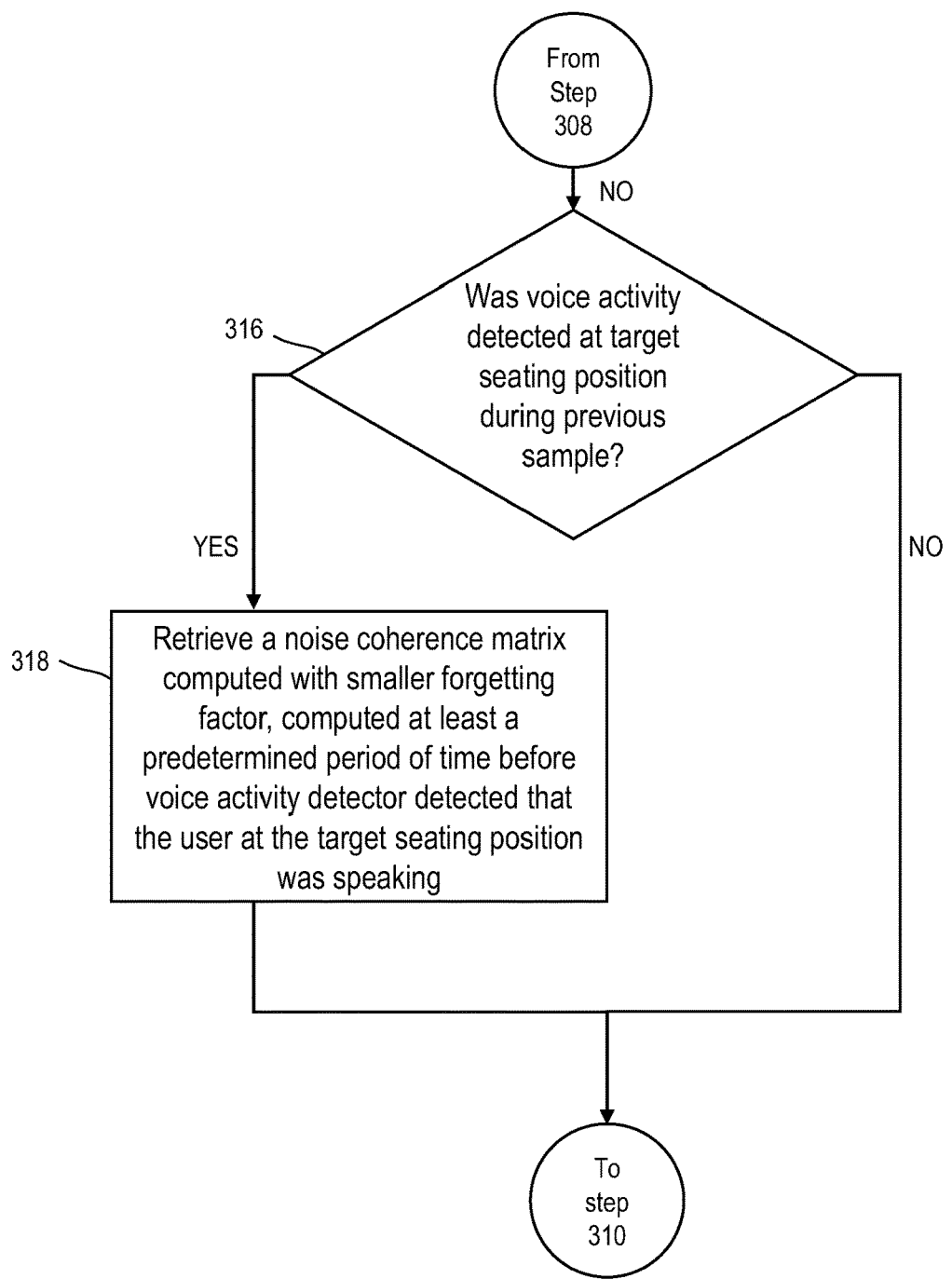
FIG. 3D depicts a method for adaptive beamforming in which noise coherence matrices with variable forgetting factors are selected according to the voice activity detector of a least one user, according to an example.

FIG. 3D, which is situated in the NO branch of FIG. 3B, depicts the steps of retrieving the noise coherence matrix with smaller forgetting factor. At step 316 of FIG. 3D, if voice activity was detected at the previous sample, then at step 318, a noise coherence matrix computed with a smaller forgetting factor, having been calculated at some point in time before the detection of the voice activity (beginning at or before the previous sample), is retrieved. This retrieved noise coherence matrix computed with smaller forgetting factor is used to estimate the acoustic signal at the target seat in step 310. If, at step 316, voice activity was not detected during the previous sample, then at step 310, the noise coherence matrix with smaller forgetting factor, calculated according to the current sample and the previous sample, is used to estimate the acoustic signal at the target seating position.

While the methods for estimating the acoustic signal at the target seat using smaller and larger forgetting factors is described for a single seat, it should be understood that it can be extended to any number of seats within the vehicle cabin.

The performance of the algorithm can suffer for a short period of time when a sudden change in the noise condition occurs. This can happen for example when music is turned on or off, when a navigation prompt occurs, or when speech starts from an undesired location. During the convergence time of the noise coherence to the new noise condition, the performance of the array can deteriorate. To circumvent this, the principle of superposition can be used to introduce adjustments to the noise coherence matrix to better match the current noise condition and reduce the convergence time.

For example, at any given time, the overall noise-plus-interference signal can be expressed as follows:

$$n(t) = \sum_{i=1}^{N_I} n_i(t), \quad (12)$$

where $n_i(t)$ is the ith interference/noise signal and $N_I$ is the total number of interference/noise signals. These signals can include road noise, wind noise, ventilation noise, navigation prompts, undesired speech, music, among others. Assuming that the interference signals are uncorrelated, i.e. $<n_i(t), n_j(t)>=0$ for $i \neq j$, the overall noise coherence matrix can be expressed as follows:

$$C_{nn}(k,n) = \sum_{i=1}^{N_I} C_{nn,i}(k,n), \quad (13)$$

where $C_{nn,1}(k,n)$ is the noise coherence matrix of the ith interference/noise signal.

This formulation can be used to update the noise coherence matrix when a known interference signal is introduced to the vehicle cabin. In this example, noise coherence matrices associated with known signals, i.e., music, navigation, etc., are predetermined (e.g., as a factory default set of known noise coherence matrices or as a set of noise coherence matrices that are calculated before the known signal is introduced to the vehicle cabin) and added to the noise coherence matrix update as follows:

$$C_{nn}(k,n_0) = C_{nn}(k,n_0-1) + g_i \cdot C_{nn,1}(k), \quad (14)$$

where $n_0$ denotes the frame at which the known interference signal $n_i(t)$ appeared or disappeared, $C_{nn,i}(k)$ is the noise coherence matrix associated with the interference signal, and $g_i$ is a gain that reflects the level of the interference signal. In other words, the predetermined noise coherence matrix associated with a known signal is superposed with the noise coherence matrix calculated from the microphone signals m. For example, if voice navigation is queued to be played in the vehicle cabin, the noise coherence matrix can be updated with the predetermined noise coherence matrix during the same frame at which the navigation signal is played in the vehicle cabin. This permits the noise coherence matrix to be updated with the predetermined noise coherence matrix of the known signal faster than the matrix coherence matrix could otherwise be updated from the microphone signals only. Once the noise coherence matrix is updated with the predetermined noise coherence matrix, normal updating of the noise coherence matrix can resume.

Figure 4A:
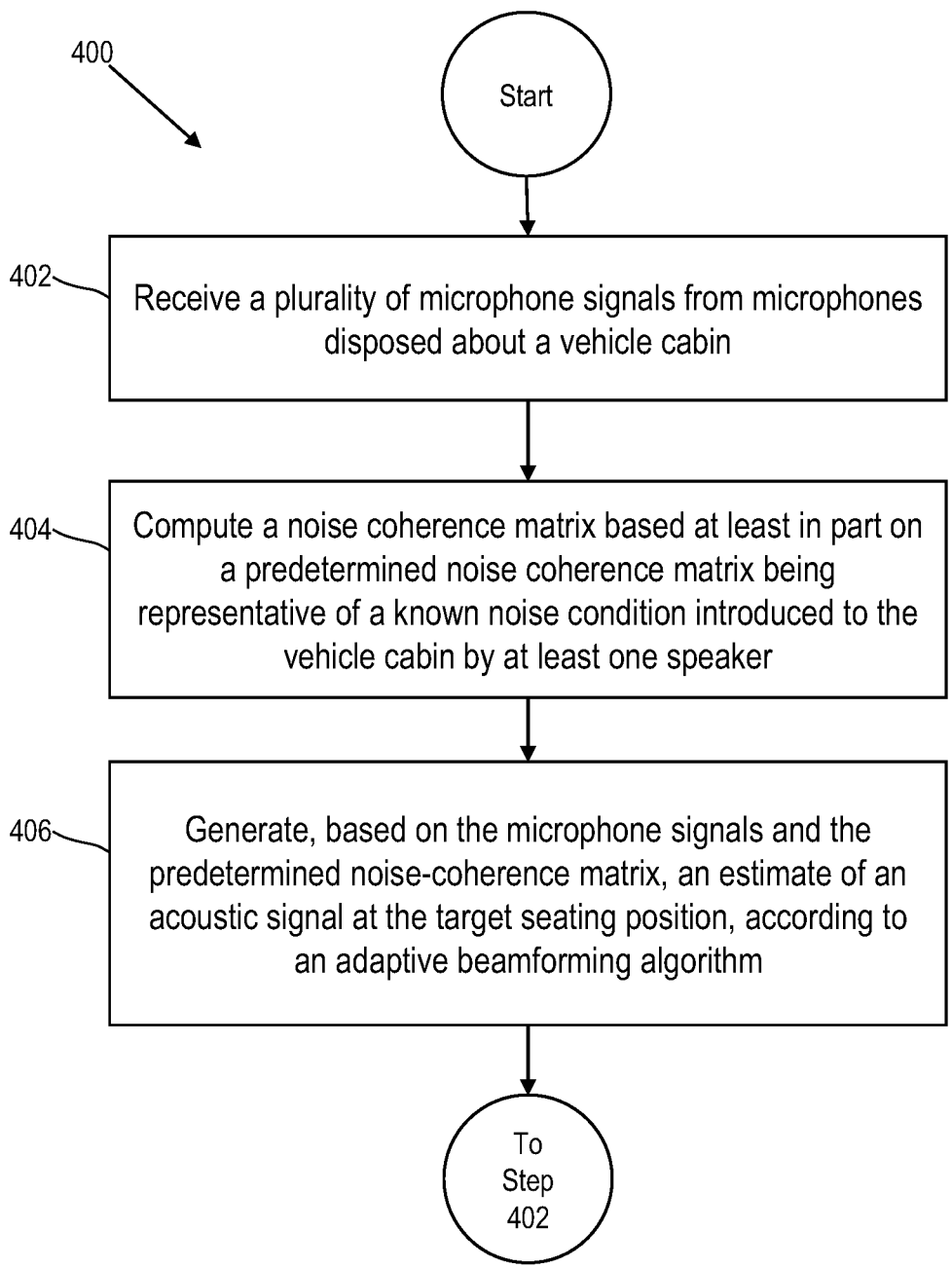
FIG. 4A depicts a method for adaptive beamforming in which the noise coherence matrix is, at least in part, based on a predetermined noise coherence matrix, according to an example.
Figure 4B:
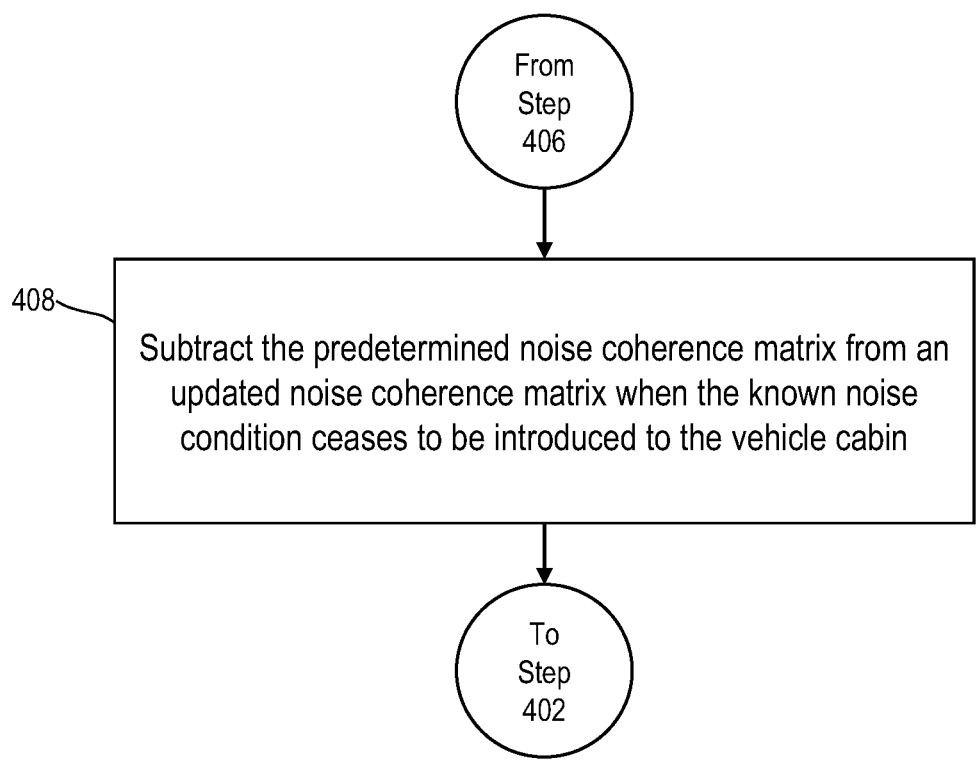
FIG. 4B depicts a method for adaptive beamforming in which the noise coherence matrix is, at least in part, based on a predetermined noise coherence matrix, according to an example.
Figure 5:
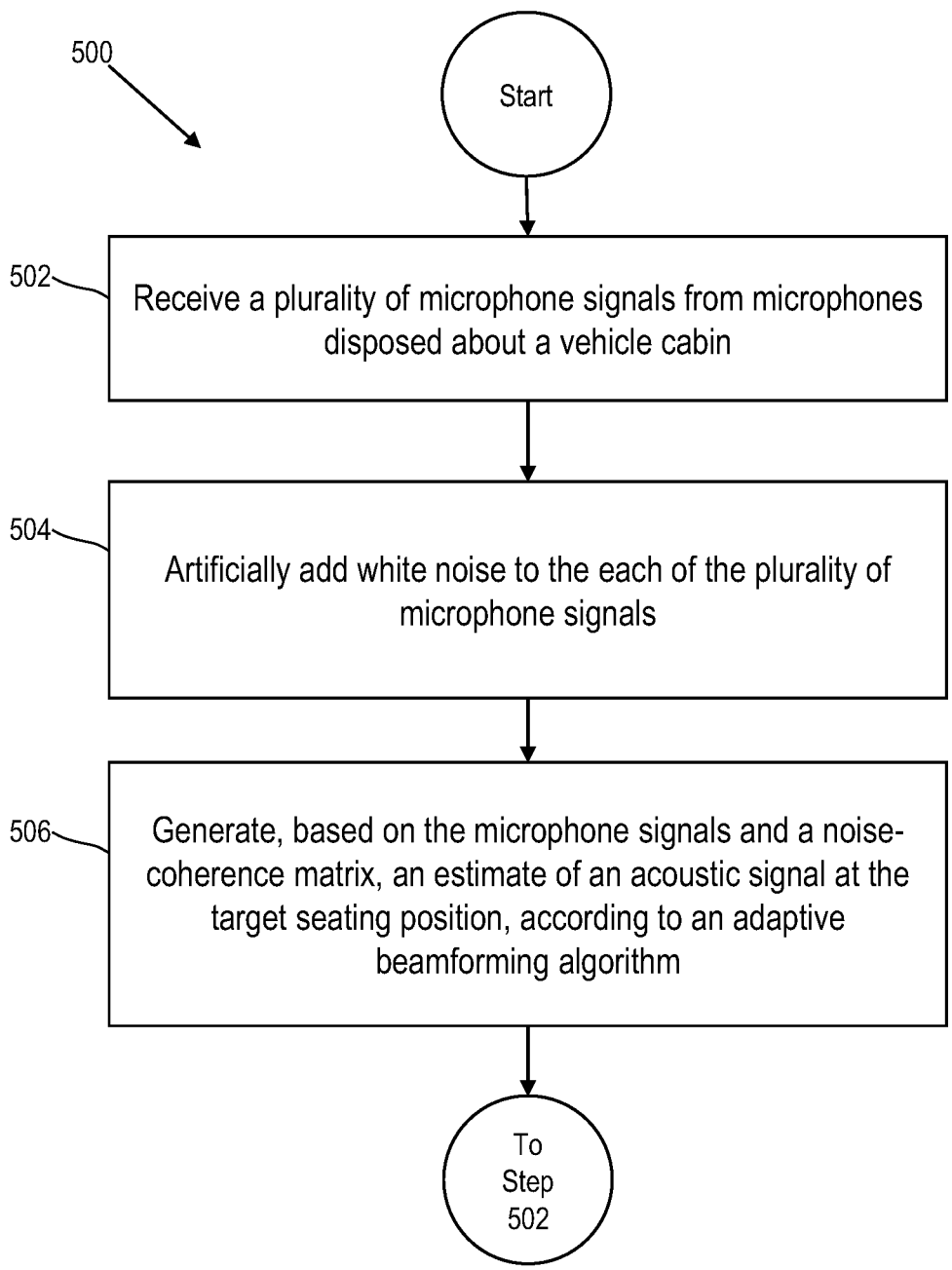
FIG. 5 depicts a method for adaptive beamforming in which artificial white noise is added to the microphone signals, according to an example.

This is depicted in the method 400 of FIG. 4A, in which, at step 404, a noise coherence matrix is computed based, in part, on a predetermined noise coherence matrix that is representative of a known noise condition introduced to the vehicle cabin by at least one speaker in the vehicle cabin (e.g., navigation, music, etc.) As described above, the predetermined noise coherence matrix can be a prestored factory default noise coherence matrix or can be calculated while the known noise condition is queued to be played in the vehicle cabin. The noise coherence matrix can be computed, e.g., by superposing the calculated noise coherence matrix with the predetermined noise coherence matrix.

Likewise, the predetermined noise coherence matrix can be subtracted from the calculated noise coherence matrix when the known is signal is no longer played in the vehicle cabin. This is particularly effective when the known signal ceases to be played while the user is speaking, i.e., when the noise coherence matrix is not being updated. Otherwise failing to subtract the noise coherence matrix of the known signal when the noise coherence matrix is not being updated results in an incorrect noise coherence matrix that accounts for a signal not being played and thus does not perform properly.

Thus, at step 408, the noise coherence matrix is subtracted from the updated noise coherence matrix. The updated noise coherence matrix is the noise coherence matrix, as calculated from, at least, the predetermined noise coherence matrix. This step occurs at a later sample, when the noise coherence matrix has been updated and the known noise condition ceases to be played in the vehicle cabin.

It should be noted that instead of adding or removing the corresponding noise coherence matrix in a single frame, a short transition period over which the term $g_i \cdot C_{nn,i}(k)$ is added or removed can be used. In other words, the gain $g_i$ can be increased from a smaller value to a larger value over a plurality of frames to prevent sudden changes in the filter coefficients. The final value of $g_i$ can be determined by the magnitude of the known noise condition in the vehicle cabin 100.

In the case where the matrix inversion lemma is used to update the inverse of the noise coherence matrix (i.e., Eq. (3) instead of direct matrix inversion after Eq. (2)), the superposition method discussed above in connection with Eq. (14) cannot be used to update the noise coherence matrix.

Thus, in the proposed method, multiple solutions, where each solution consists of the inverses of the noise coherence matrices $C_{nn}^{-1}(k)$, are stored in the memory. Each solution corresponds to a set of conditions (music level, HVAC level, vehicle speed, etc.). The stored solutions can either be computed a priori or updated during run-time. When a known condition is encountered, the associated inverses can be loaded from the memory and the system then adapts the noise coherence matrix inverse using Eq. (3). In other words, rather than superposing the calculated noise coherence matrix with a predetermined noise coherence matrix, from which an inverse noise coherence matrix can then be calculated, the entire inverse noise coherence matrix (calculated using the matrix inversion lemma) is substituted for the predetermined inverse noise coherence matrix when a known signal is to be introduced to the cabin.

This solution is, however, memory intensive because a multiplicity of solutions must be prestored, including for combinations of conditions such as soundstage setting, music level, HVAC level, vehicle speed, etc., as the combination of each of these conditions determines the inverse of the noise coherence matrix. In an alternative example, where the matrix inversion lemma is used, the value of the inverse of the noise coherence matrix, calculated using the matrix inversion lemma, is inverted to yield the non-inverted noise coherence matrix. The non-inverted noise coherence matrix is then superposed with the predetermined noise coherence matrix according to Eq. (14), at which point this value is again inverted to result in the inverse of the noise coherence matrix. Once the inverse of the superposed solution from Eq. (14) is determined, it can then be updated using the matrix inversion lemma according to new microphone signals m. This solution is more computationally intensive but requires fewer memory resources to implement than substituting the inverted noise coherence matrix with a predetermined inverted noise coherence matrix.

Signal-to-noise ratio (SNR) improvement is one of the main metrics that are used in evaluating the performance of a microphone array. Another performance evaluation metric is the white noise gain (WNG). The white noise gain measures the ability of the microphone array to suppress noncoherent noise. In other words, it is the SNR improvement provided by the microphone array when the noise at the microphones is white noise. The SNR improvement and white noise gain are competing metrics. Designing a microphone array for optimal SNR improvement might result in a low (or even negative) white noise gain. This results in boosting the noncoherent noise at the output of the array. On the other hand, improving the white noise gain of the array results in reducing the achievable SNR improvement.

Diagonal loading can be used to improve the white noise gain of an MVDR design. It can also improve the robustness of the design to changes in the noise conditions. If the full matrix inversion is computed at every frame, diagonal loading can be achieved by modifying Equation (1) as follows:

$$w^H(k) = \frac{[C_{nn}(k) + \mu(k) \cdot I]^{-1} \cdot d(k)}{d^H(k) \cdot [C_{nn}(k) + \mu(k) \cdot I]^{-1} \cdot d(k)}. \tag{15}$$

where $\mu(k)$ is a scalar value and I is an identity matrix. Diagonal loading adds a small value to the main diagonal of the noise coherence matrix. Increasing $\mu$ improves the white noise gain of the array at the expense of lowering its SNR improvement. The diagonal loading value can be constant across frequency bins or variable. Choosing a different $\mu$ for each frequency bin provides more flexibility in the design since the white noise gain of the array changes from one frequency bin to another. In the vehicle environment, lower frequencies tend to require larger diagonal loading values than higher frequencies.

On the other hand, if the matrix inversion lemma is used to update the inverse of the noise coherence matrix, Equation (15) cannot be used to apply diagonal loading to the design. As a workaround, Eqs. (3) and (4) can be modified to achieve the same effect. Diagonal loading adds a scalar value to the main diagonal of the noise coherence matrix. This is equivalent to adding white noise with variance equal to the loading value to the noise signal. Therefore, the observation vector x(k,n) of the microphone signals m can be modified as follows to add diagonal loading:

$$x_{DL}(k,n) = x(k,n) + \sqrt{\mu(k)} \cdot r_{WGN}(n) \tag{16}$$

where $\mu(k)$ is the desired diagonal loading value and $r_{WGN}(n)$ is a $N_A \times 1$ vector whose elements are sampled from a Gaussian distribution with mean zero and standard deviation one with $N_A$ being the number of microphones in the array. After enough averaging is done in Equations (3) and (4), the effective noise coherence matrix becomes equal to $C_{nn}(k) + \mu(k) \cdot I$. Stated differently a white noise signal (which is noncoherent) can be added to each microphone signal (either at the microphone signal or at the adaptive beamformer 112), such that the white noise signal is canceled.

This is shown in FIG. 5A, in which, at step 504 white noise is artificially added to each of the plurality of microphone signals (e.g., according to Eq. (16)), such that the white noise gain is improved when the acoustic signal at the target seat is estimated at step 506. As described above, the white noise signal can be added to the microphone signals or added at the adaptive beamformer 112.

In either the diagonal loading or added white noise examples, several methods can be used to set the values $\mu(k)$. For instance, the value of $\mu(k)$ can be set to achieve a minimum white noise gain at each frequency. Alternatively, a condition number of the combined noise coherence matrix $C_{nn}(k) + \mu(k) \cdot I$, or of the noise coherence matrix after the white noise signal is artificially added to the microphone signals 104, is used to set $\mu(k)$. The condition number is a metric that characterizes the degree to which a given matrix can be inverted. Consequently, a condition number that is too low will affect the performance of the array; whereas, a condition number that is too high will result in amplifying non-coherent noise for each frequency bin. Increasing µ(k) results in lowering the condition number of the combined noise coherence matrix which in turn results in a more robust MVDR design.

The value of µ(k) can be computed a priori and stored in the memory. It can consist of a single set of values {µ(k), k=1, ..., $N_f$} where $N_f$ is the number of frequency bins. The set is designed to perform well with a variety of noise conditions. That is, in most noise conditions, the condition number of the combined noise coherence or the noise coherence matrix will be greater than a minimum condition number and less than a maximum condition number. In other words, the same value of µ(k) is used, per frequency bin, irrespective of the noise condition detected within the vehicle cabin. The minimum condition number is the minimum condition number allowable to maintain acceptable array performance, such as, in one example, a condition number of 20. The maximum condition number is a value selected according to maximum acceptable degree that the non-coherent noise can be amplified, such as, in one example, a condition number 100.

In an alternative example, multiple sets of diagonal loading values {µ(k), k=1, ..., $N_f$} can also consist of multiple sets of values where each set performs well in at least one noise condition. The set that is used is picked based on the actual noise condition that is encountered in order to maintain the condition number between the minimum condition number and the maximum condition number, or to maintain the condition number close to an ideal condition number (e.g., 70). Thus, the noise condition of detected microphone signals m dictate which set of values of µ(k) are used.

In an alternative example, the value of µ(k) can be updated in real-time to adapt to the changes in the noise conditions. This can be done, for example, by monitoring the condition number of the effective noise coherence matrix, comparing it to a desired pre-determined condition number, and adjusting the diagonal loading values accordingly.

Regarding the use of symbols herein, a capital letter, e.g., H, generally represents a term, signal, or quantity in the frequency or spectral domain, and a lowercase letter, e.g., h, generally represents a term, signal, or quantity in the time domain. Relation between time and frequency domain is generally well known, and is described at least under the realm of Fourier mathematics or analysis, and is accordingly not presented herein. Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g, f, and discrete frequency indexes, e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

The functionality described herein, or portions thereof, and its various modifications (hereinafter "the functions") can be implemented, at least in part, via computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An adaptive beamforming system, comprising:
a plurality of microphones disposed about a vehicle cabin, each of the plurality of microphones generating a microphone signal, wherein the vehicle cabin defines a plurality of seating positions;
a voice-activity detector configured to detect when, at least, a user seated in a target seat of the plurality of seating positions is speaking; and
an adaptive beamformer configured to receive the microphone signals from the plurality of microphones and to generate, based on the microphone signals and a noise coherence matrix, an estimate of an acoustic signal at the target seating position according to an adaptive beamforming algorithm, the noise coherence matrix being updated when, according to the voice-activity detector, the user in the target seating position is not speaking, wherein the noise coherence matrix ceases to be updated when, according to the voice-activity detector, the user seated in the target seating position is speaking.

2. The system of claim 1, wherein the target seat is selected according to a user selection.

3. The system of claim 1, wherein the target seat is selected according to which seating position of the plurality of seating positions the voice activity detector detects a user speaking.

4. The system of claim 1, wherein the adaptive beamformer is further configured to cease updating the noise coherence matrix when, according to the voice-activity detector, a user in any of the plurality of seating positions is speaking.

5. The system of claim 1, wherein the adaptive beamformer is further configured to calculate a plurality of noise coherence matrices, each of the plurality of noise coherence matrices being representative of a noise condition at a respective associated seating position of the plurality of seating positions, wherein each of the plurality of noise coherence matrices ceases to be updated when, according to the voice-activity detector, a user seated in the associated seating position is speaking.

6. The system of claim 1, wherein the adaptive beamformer is further configured to generate an estimate of a second acoustic signal at a second target seating position, when, according to the voice-activity detector, the user seated in the target seating position is speaking and the user seated in the second target seating position is speaking, wherein the estimate of the acoustic signal and the second acoustic signal being summed together.

7. The system of claim 1, wherein the adaptive beamformer is further configured to generate an estimate of the acoustic signal and a second acoustic signal at a second target seating position, according to a second adaptive beamforming algorithm, when, according to the voice-activity detector, the user seated in the target seating position is speaking and the user seating in the second target seating position is speaking.

8. The system of claim 7, wherein the second adaptive beamforming algorithm is a linearly constrained minimum variance beamforming algorithm.

\* \* \* \* \*